United States Patent
Niimi et al.

(10) Patent No.: US 6,359,327 B1
(45) Date of Patent: *Mar. 19, 2002

(54) MONOLITHIC ELECTRONIC ELEMENT FABRICATED FROM SEMICONDUCTING CERAMIC

(75) Inventors: Hideaki Niimi, Hikone; Tatsuya Matsunaga, Shiga-ken, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,976

(22) Filed: Mar. 1, 2000

Related U.S. Application Data

(63) Continuation-in-part of application No. 09/262,573, filed on Mar. 4, 1999, now Pat. No. 6,153,931.

(30) Foreign Application Priority Data

Mar. 5, 1998 (JP) ............................................ 10-053626
Mar. 5, 1999 (JP) ............................................ 11-058444

(51) Int. Cl.⁷ ...................... H01L 31/0256; H01L 23/06
(52) U.S. Cl. ........................ 257/613; 257/703; 501/135; 501/136; 501/137; 501/138
(58) Field of Search ............................... 257/613, 703; 501/135–138

(56) References Cited

U.S. PATENT DOCUMENTS

| | | | |
|---|---|---|---|
| 4,335,216 A | * | 6/1982 | Hodgkins et al. ............. 501/32 |
| 4,540,676 A | * | 9/1985 | Chu et al. ...................... 501/138 |
| 5,296,426 A | * | 3/1994 | Burn ............................ 501/139 |
| 6,153,931 A | | 11/2000 | Niimi et al. .................. 257/703 |

FOREIGN PATENT DOCUMENTS

| | | | | |
|---|---|---|---|---|
| FR | 2508436 A | * | 12/1982 | ........... C04B/35/46 |
| JP | 8-153605 | | 6/1996 | |

OTHER PUBLICATIONS

"Semiconducting Barium Titanate Ceramics Prepared by Boron–Containing Liquid–Phase Sintering"; In–Chyuan Ho; *Journal of the American Ceramic Society*; vol. 77, No. 3; 1994; pp. 829–832.

* cited by examiner

*Primary Examiner*—Allan R. Wilson
(74) *Attorney, Agent, or Firm*—Ostrolenk, Faber, Gerb & Soffen, LLP

(57) ABSTRACT

A monolithic electronic element is fabricated from a semiconducting ceramic, which element can be produced through firing at 1000° C. or lower and exhibits a satisfactory PTC characteristic even when the element is produced through reoxidation at low temperature. The monolithic electronic element 1 includes a sintered laminate 3 formed of alternatingly stacked semiconducting ceramic layers 5 and internal electrode layers 7, and external electrodes 9 formed on the sintered laminate, wherein the semiconducting ceramic layers 5 comprise sintered barium titanate containing boron oxide; an oxide of at least one metal selected from among barium, strontium, calcium, lead, yttrium and a rare earth element; the boron oxide being incorporated in an amount, as reduced to atomic boron (B), satisfying the following relationships: $0.001 \leq B/\beta \leq 0.50$ and $0.5 \leq B/(\alpha-\beta) \leq 10.0$, wherein $\alpha$ represents the total number of atoms of barium site elements, and $\beta$ represents the total number of atoms of titanium site elements.

18 Claims, 1 Drawing Sheet

MONOLITHIC ELECTRONIC ELEMENT FABRICATED FROM SEMICONDUCTING CERAMIC

This is a continuation-in-part of application Ser. No. 09/262,573, filed Mar. 4, 1999 now U.S. Pat. No. 6,153,931.

BACKGROUND OF THE INVENTION

1. Field of the Invention

The present invention relates to a monolithic electronic element fabricated from a semiconducting ceramic and, more particularly, to a monolithic electronic element fabricated from a semiconducting ceramic (hereinafter may be referred to as monolithic electronic element) having a positive temperature coefficient of resistance.

2. Background Art

Semiconducting electronic elements having a positive temperature coefficient of resistance (hereinafter referred to as a PTC characteristic), meaning that electrical resistance increases drastically when temperature exceeds the Curie temperature, have been used to protect a circuit from overcurrent or to control degaussing module of a color television set. In view of their advantageous PTC characteristic, semiconducting ceramics predominantly comprising barium titanate have generally been used in such semiconducting electronic elements.

However, in order to make barium titanate-based ceramics semiconducting, firing must generally be performed at a temperature of 1300° C. or more. Such treatment at high temperature has the following drawbacks: a tendency to damage a furnace used for firing; a high cost of maintaining the furnace; and high energy consumption. Thus, there has been demand for semiconducting ceramics comprising barium titanate which can be fired at lower temperature.

To overcome the above drawbacks, a modified technique is disclosed in "Semiconducting Barium Titanate Ceramics Prepared by Boron-Conducting Liquid-Phase Sintering" (In-Chyuan Ho, *Communications of the American Ceramic Society*, Vol. 77, No. 3, P829–p832, 1994). Briefly, the temperature at which the ceramics exhibit semiconduction is lowered by addition of boron nitride to barium titanate. The literature reports that the boron nitride-added ceramics can become semiconducting at a firing temperature of about 1100° C.

Meanwhile, in recent years there has been a demand for monolithic chip-type semiconducting ceramic electronic elements which attain low resistance and high withstand voltage at ambient temperature and are suitable for high-density packaging.

Generally, a monolithic chip-type semiconducting ceramic electronic element is produced by stacking ceramic green sheets and internal electrode paste layers alternatingly and firing the same together in a firing furnace. Therefore, a base metal such as nickel is used for producing internal electrodes, in that such a base metal can establish ohmic contact with a ceramic material even when the metal is simultaneously fired with the ceramic material. When fired in air, such a base metal is oxidized. Thus, the stacked body is fired in a reducing atmosphere and then reoxidized at a temperature at which internal electrodes are not oxidized, to thereby fire a semiconductor ceramic material and an internal electrode material together. However, reoxidation carried out at a relatively low temperature is detrimental to a PTC characteristic of the thus-fired product.

Japanese Patent Application Laid-Open (kokai) No. 8-153605 discloses a method for attaining a PTC characteristic even when reoxidation is carried out at low temperature. The method employs a perovskite compound in a form of microparticles as a titanium salt serving as a predominant component. Use of the perovskite compound enables sintering at a temperature as low as 1000° C.–1250° C. and provision of a PTC characteristic even when reoxidation is carried out at a temperature as low as 500° C. or higher.

However, a conventional monolithic electronic element must be produced through reoxidation at approximately 1000° C. so as to obtain a satisfactory PTC characteristics, and internal electrodes might be oxidized. Therefore, there has been demand for a monolithic electronic element which can be produced through firing at low temperature so as to obtain a satisfactory PTC characteristic through reoxidation at a temperature lower than that employed conventionally.

SUMMARY OF THE INVENTION

In view of the foregoing, the present invention is directed to provision of a monolithic electronic element which can be produced through firing at 1000° C. or lower and exhibits a satisfactory PTC characteristic even when the element is produced through reoxidation at low temperature.

Accordingly, the present invention provides a monolithic electronic element fabricated from a semiconducting ceramic, which element comprises a sintered laminate formed of alternatingly stacked semiconducting ceramic layers and internal electrode layers, and external electrodes formed on the sintered laminate, wherein each semiconducting ceramic layer comprises semiconducting sintered barium titanate containing the following substances: boron oxide and an oxide of at least one metal selected from among barium, strontium, calcium, lead, yttrium and a rare earth element; a portion of the titanium being optionally replace by at least one metal selected from among tin, zirconium, niobium, tungsten and antimony, the boron oxide being incorporated in an amount, as reduced to atomic boron, satisfying the following relationships:

$$0.001 \leq B/\beta \leq 0.50$$

and $$0.5 \leq B/(\alpha-\beta) \leq 10.0$$

wherein $\alpha$ represents the total number of atoms of barium, strontium, calcium, lead, yttrium and a rare earth element contained in the semiconducting ceramic, and $\beta$ represents the total number of atoms of titanium, tin, zirconium, niobium, tungsten and antimony contained in the semiconducting ceramic.

The semiconducting ceramic having such a composition can be fired at 1000° C. or lower and exhibits its improved PTC characteristic even when the ceramic is subjected to reoxidation at low temperature. Thus, a base metal can be employed as an internal electrode, and a satisfactory PTC characteristic is realized.

Preferably, the monolithic electronic element fabricated from a semiconducting ceramic contains a donor element and an acceptor element, these elements being incorporated in amounts satisfying the following relationships:

$$0.0001 \leq Md/\beta \leq 0.005$$

and $$0.00001 \leq Ma/\beta \leq 0.005$$

wherein Md represents the total number of atoms of a donor element in the semiconducting ceramic layers, Ma represents the total number of atoms of an acceptor element in the semiconducting ceramic layers, and β represents the total number of atoms of titanium, tin, zirconium, niobium, tungsten and antimony contained in the semiconducting ceramic.

The ceramic having such a composition provides a monolithic electronic element which exhibits its PTC characteristic very effectively.

BRIEF DESCRIPTION OF THE DRAWING

Various other objects, features, and many of the attendant advantages of the present invention will be readily appreciated as the same become better understood with reference to the following detailed description of the preferred embodiments in connection with the accompanying drawing, in which:

The sole Figure is a schematic cross-sectional view of one example of the monolithic electronic element fabricated from a semiconducting ceramic according to the present invention.

DESCRIPTION OF THE PREFERRED EMBODIMENTS

Figure 1:
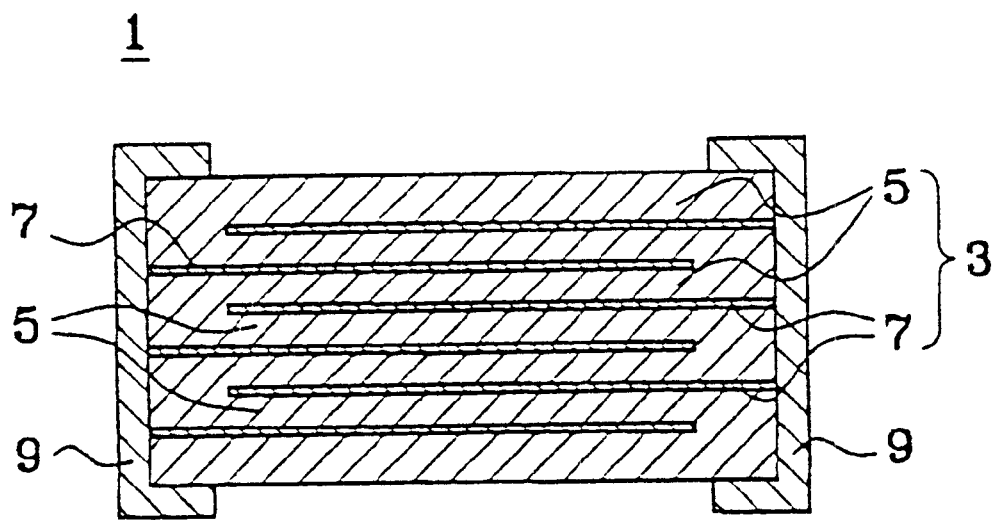

The monolithic electronic element of the present invention comprises a sintered laminate formed of alternatingly stacked semiconducting barium titanate ceramic layers and internal electrode layers predominantly comprising a base metal, and external electrodes formed on a face of the sintered laminate where the internal electrodes are exposed.

The semiconducting ceramic employed in the present invention comprises barium titanate as a predominant component and boron oxide as a by-component.

Ba in the above barium titanate may be partially substituted by Sr, Ca, Pb, Y or a rare earth element (these elements will hereinafter be referred to as Ba site elements), while Ti in the above barium titanate may be partially substituted by each of Sn, Zr, Nb, W and Sb (these elements will hereinafter be referred to as Ti site elements).

In addition to the Ba site elements, Ba or another Ba-substitutable element such as Sr, Ca, Pb, Y or a rare earth element is further added to the above semiconducting ceramic such that the total amount of Ba and Ba-substitutable elements such as Sr, Ca, Pb, Y and a rare earth element exceeds the total amounts of Ti and Sn, Zr, Nb, W and Sb.

The aforementioned semiconducting ceramic may contain a donor element and an acceptor element. The term "donor element" herein refers to as an element such as Y, Nb, Sb, W, Ta, Mo or a rare earth element, generally serving as a donor in $BaTiO_3$, while the term "acceptor element" herein refers to an element such as Mn, Fe, Co, Ni, Cr or an alkali metal, generally serving as an acceptor in $BaTiO_3$.

The aforementioned internal electrodes may be formed of a base metal such as Ni, Co, Fe or Mo. These base metals may be used singly or in the form of an alloy. Of these, Ni is preferably used, in view of excellent oxidation resistance.

No particular limitation is imposed on the material constituting the aforementioned external electrodes, and metals such as Ag, Pd and an Ag—Pd alloy may be used.

EXAMPLES

The present invention will next be described by way of examples, which should not be construed as limiting the invention thereto.

Example 1

A method for producing the monolithic electronic element of the present invention will be described using the sole Figure, a schematic cross-sectional view of one example of the monolithic electronic element fabricated from a semiconducting ceramic according to the present invention.

Firstly, barium titanate was hydrothermally synthesized so as to have a ratio of Ba site elements to Ti site elements of 0.998. Then, $BaCO_3$, $Sm_2O_3$, BN, and $MnCO_3$ were weighed and added to the barium titanate so as to provide a mixture in accordance with the following formula (I):

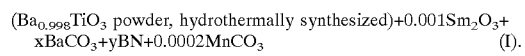

$(Ba_{0.998}TiO_3$ powder, hydrothermally synthesized$)+0.001Sm_2O_3+$
$xBaCO_3+yBN+0.0002MnCO_3$ (I).

The resultant mixture was admixed with a binder, and the formed mixture was wet-mixed with zirconia balls for 10 hours to thereby form a ceramic slurry. The slurry was shaped through the doctor blade method and dried to thereby form ceramic green sheets. A Ni paste was applied onto each green sheet through printing so as to form an internal electrode layer on the sheet, and the thus-prepared sheets were stacked to thereby produce a laminate. After removal of the binder at 300° C. in air, the laminate was fired at 950° C. in a hydrogen/nitrogen reducing atmosphere for two hours to thereby produce a sintered laminate. The composition of each ceramic layer in the sintered laminate is represented by the following formula:

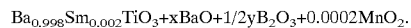

$Ba_{0.998}Sm_{0.002}TiO_3+xBaO+1/2yB_2O_3+0.0002MnO_2$.

Next, as shown in the Figure, a paste for forming an Ag electrode was applied onto faces of a sintered laminate 3 comprising semiconducting ceramic layers 5 and internal electrode layers 7, internal electrodes being exposed to the faces. The obtained piece was fired at 800° C. in air for two hours to thereby form external electrodes 9 through baking and to thereby carry out reoxidation. Thus, a monolithic electronic element 1 according to the present invention was fabricated.

Electric resistance at room temperature and the ratio of change in resistance represented by log(R250/R25), wherein R250 represents resistance at 250° C. and R25 represents resistance at 25° C., were measured for a plurality of electronic elements fabricated in a similar manner, the elements being produced by modifying the amount of added $BaCO_3$ (X) and the amount of added BN (Y) to form the corresponding ceramic. The results are shown in Table 1. In Example 1, the following relationships are satisfied: B/β= B/Ti and B/(α−β)=B/(Ba+Sm−Ti).

TABLE 1

| Sample No. | B/Ti (B/β) | B/(Ba + Sm—Ti) (B/α-β) | Additives Amount of elemental Ba (mol) | Amount of elemental B (mol) | Characteristics Resistance at room temperature (Ω) | Ratio of change in resistance log (R250/R25) | Sinterability |
|---|---|---|---|---|---|---|---|
| *1 | 0.0005 | 0.2 | 0.00250 | 0.005 | at least 1,000,000 | not measurable | × |
| *2 | 0.0005 | 0.5 | 0.00100 | 0.005 | at least 1,000,000 | not measurable | × |
| *3 | 0.0005 | 2 | 0.00025 | 0.005 | 55000 | 0.6 | × |
| *4 | 0.0005 | 8 | 0.00006 | 0.005 | 6000 | 0.9 | × |
| *5 | 0.0005 | 12 | 0.00004 | 0.005 | 25000 | 0.8 | × |
| *6 | 0.001 | 0.2 | 0.00500 | 0.001 | 28 | 1.3 | Δ |
| 7 | 0.001 | 0.5 | 0.00200 | 0.001 | 0.97 | 3.5 | ○ |
| 8 | 0.001 | 2 | 0.00050 | 0.001 | 0.62 | 3.9 | ○ |
| 9 | 0.001 | 8 | 0.00013 | 0.001 | 0.89 | 3.3 | ○ |
| *10 | 0.001 | 12 | 0.00008 | 0.001 | 30 | 2.2 | Δ |
| *11 | 0.01 | 0.2 | 0.05000 | 0.01 | 25 | 1.9 | Δ |
| 12 | 0.01 | 0.5 | 0.02000 | 0.01 | 0.99 | 3.6 | ○ |
| 13 | 0.01 | 2 | 0.00500 | 0.01 | 0.45 | 3.8 | ○ |
| 14 | 0.01 | 8 | 0.00125 | 0.01 | 0.95 | 3.7 | ○ |
| *15 | 0.01 | 12 | 0.00083 | 0.01 | 45 | 2.6 | Δ |
| *16 | 0.05 | 0.2 | 0.25000 | 0.05 | 26 | 2.9 | Δ |
| 17 | 0.05 | 0.5 | 0.10000 | 0.05 | 0.82 | 3.9 | ○ |
| 18 | 0.05 | 2 | 0.02500 | 0.05 | 0.21 | 4.2 | ○ |
| 19 | 0.05 | 8 | 0.00625 | 0.05 | 0.73 | 4.1 | ○ |
| *20 | 0.05 | 12 | 0.00417 | 0.05 | 19 | 2.4 | Δ |
| *21 | 0.1 | 0.2 | 0.50000 | 0.1 | 16 | 2.6 | Δ |
| 22 | 0.1 | 0.5 | 0.20000 | 0.1 | 0.65 | 3.7 | ○ |
| 23 | 0.1 | 2 | 0.05000 | 0.1 | 0.52 | 3.8 | ○ |
| 24 | 0.1 | 8 | 0.01250 | 0.1 | 0.65 | 3.8 | ○ |
| *25 | 0.1 | 12 | 0.00833 | 0.1 | 26 | 2.9 | Δ |
| *26 | 0.5 | 0.2 | 2.50000 | 0.5 | 56 | 2.1 | Δ |
| 27 | 0.5 | 0.5 | 1.00000 | 0.5 | 2.5 | 3.1 | ○ |
| 28 | 0.5 | 2 | 0.25000 | 0.5 | 2.1 | 3.2 | ○ |
| 29 | 0.5 | 8 | 0.06250 | 0.5 | 2.9 | 3.1 | ○ |
| *30 | 0.5 | 12 | 0.04167 | 0.5 | 35 | 2.6 | Δ |
| *31 | 0.7 | 0.2 | 3.50000 | 0.7 | 89 | 1.3 | Δ |
| *32 | 0.7 | 0.5 | 1.40000 | 0.7 | 25 | 1.5 | Δ |
| *33 | 0.7 | 2 | 0.35000 | 0.7 | 39 | 1.5 | Δ |
| *34 | 0.7 | 8 | 0.08750 | 0.7 | 190 | 1.3 | Δ |
| *35 | 0.7 | 12 | 0.05833 | 0.7 | 480 | 0.9 | Δ |

*The symbol refers to samples which fall outside the scope of the present invention.

As is clear from Table 1, samples having parameters falling within the ranges of $0.001 \leq B/\beta \leq 0.50$ and $0.5 \leq B/(\alpha-\beta) \leq 10.0$ exhibit low resistance at room temperature and have a ratio of change in resistance represented by log (R250/R25) of at least 2.

Sample Nos. 1 to 5, which have a B/β less than 0.001, exhibit very high resistance at room temperature and a low ratio of change in resistance, whereas Sample Nos. 31 to 35, which have a B/β in excess of 0.50, exhibit high resistance at room temperature and a low ratio of change in resistance. Sample Nos. 1, 6, 11, 16, 21, 26, and 31, which have a B/(α-β) less than 0.5, exhibit high resistance at room temperature and a low ratio of change in resistance, whereas Sample Nos. 5, 10, 15, 20, 25, 30, and 35, which have a B/(α-β) in excess of 10.0, exhibit high resistance at room temperature and a low ratio of change in resistance.

Example 2

The procedure of Example 1 was repeated except that the amount of added $BaCO_3$ (X) and the amount of added BN (Y) were fixed at 0.02 mol and 0.06 mol, respectively, and the amount of added $Sm_2O_3$ (Md) serving as a source of a donor and the amount of added $MnCO_3$ (Ma) serving as a source of an acceptor element were modified, to thereby produce monolithic electronic elements. In a similar manner, electric resistance at room temperature and a ratio of change in resistance represented by log (R250/R25) were measured. The results are shown in Table 2.

TABLE 2

| Sample No. | Sm/Ti (Md/β) | Mn/Ti (Ma/β) | Resistance at room temperature (Ω) | Ratio of change in resistance log (R250/R25) |
|---|---|---|---|---|
| *41 | 0.002 | 0.000005 | 0.15 | 2.2 |
| 42 | 0.002 | 0.00001 | 0.17 | 3.3 |
| 43 | 0.002 | 0.00005 | 0.19 | 3.8 |
| 44 | 0.002 | 0.0001 | 0.20 | 4.1 |
| 45 | 0.002 | 0.0005 | 0.35 | 4.5 |
| 46 | 0.002 | 0.001 | 1.20 | 4.9 |
| 47 | 0.002 | 0.005 | 3.50 | 5.3 |
| *48 | 0.002 | 0.01 | 890.00 | 1.5 |
| *49 | 0.00005 | 0.0005 | 260.00 | 1.2 |
| 50 | 0.0001 | 0.0005 | 2.60 | 4.2 |
| 51 | 0.0005 | 0.0005 | 0.80 | 5.0 |
| 52 | 0.001 | 0.0005 | 0.41 | 4.6 |
| 53 | 0.005 | 0.0005 | 0.32 | 3.1 |
| *54 | 0.01 | 0.0005 | 0.20 | 1.9 |

*The symbol refers to samples which fall outside the scope of the present invention.

As is clear from Table 2, samples having parameters falling within the ranges of $0.0001 \leq Md/\beta \leq 0.005$ and $0.00001 \leq Ma/\beta \leq 0.005$ exhibit low resistance at room temperature and have great increase in the ratio of change in resistance represented by log(R250/R25).

Sample No. 49, which has a Md/β less than 0.0001, exhibits very high resistance at room temperature and a low ratio of change in resistance, whereas Sample No. 54, which has a Md/β in excess of 0.005, exhibits a low ratio of change in resistance.

Sample No. 41, which has a Ma/β less than 0.00001, exhibits a low ratio of change in resistance, whereas Sample No. 48, which has a Ma/β in excess of 0.005, exhibits high resistance at room temperature and a low ratio of change in resistance.

As described hereinabove, the monolithic electronic element fabricated from a semiconducting ceramic according to the present invention comprises a sintered laminate formed of alternatingly stacked semiconducting ceramic layers and internal electrode layers, and external electrodes formed on the sintered laminate, wherein each semiconducting ceramic layer comprises a semiconducting sintered barium titanate containing the following substances: boron oxide; a first oxide of at least one metal selected from among barium, strontium, calcium, lead, yttrium, and a rare earth element; and a second oxide of at least one metal selected from among titanium, tin, zirconium, niobium, tungsten and antimony, the boron oxide being incorporated in an amount, as reduced to atomic boron (B), satisfying the following relationships:

$$0.001 \leq B/\beta \leq 0.50$$

and $$0.5 \leq B/(\alpha-\beta) \leq 10.0$$

wherein α represents the total number of atoms of barium, strontium, calcium, lead, yttrium and a rare earth element contained in the semiconducting ceramic, and β represents the total number of atoms of titanium, tin, zirconium, niobium, tungsten and antimony contained in the semiconducting ceramic. Thus, the monolithic electronic element can be produced through firing at 1000° C. or lower and exhibits a satisfactory PTC characteristic even when produced through reoxidation at low temperature.

Preferably, the monolithic electronic element fabricated from a semiconducting ceramic contains a donor element and an acceptor element, these elements being incorporated in amounts satisfying the following relationships:

$$0.0001 \leq Md/\beta \leq 0.005$$

and $$0.00001 \leq Ma/\beta \leq 0.005$$

wherein Md represents the total number of atoms of a donor element in the semiconducting ceramic layers, Ma represents the total number of atoms of an acceptor element in the semiconducting ceramic layers, and β represents the total number of atoms of titanium, tin, zirconium, niobium, tungsten and antimony contained in the semiconducting ceramic. Thus, the element satisfactorily exhibits its PTC characteristic.

What is claimed is:

1. A monolithic electronic element fabricated from a semiconducting ceramic, which element comprises a sintered laminate having external surfaces and being formed of alternatingly stacked semiconducting ceramic layers and internal electrode layers each of which is exposed to a face surface of the laminate, and external electrodes on the faces of sintered laminate to which the internal electrode layers are exposed, wherein each semiconducting ceramic layer comprises semiconducting sintered barium titanate containing boron oxide; an oxide of at least one metal selected from the group consisting of barium, strontium, calcium, lead, yttrium and rare earth element; wherein a portion of the titanium is optionally substitute by at least one metal selected from the group consisting of tin, zirconium, niobium, tungsten and antimony and the boron oxide being in an amount, as reduced to atomic boron, of $$0.001 \leq B/\beta \leq 0.50$$

and $$0.5 \leq B/(\alpha-\beta) \leq 10.0$$

wherein α represents the total number of atoms of barium, strontium, calcium, lead, yttrium and rare earth element contained in the semiconducting ceramic, and β represents the total number of atoms of titanium, tin, zirconium, niobium, tungsten and antimony contained in the semiconducting ceramic.

2. A monolithic electronic element fabricated from a semiconducting ceramic according to claim 1, wherein the metal oxide is a rare earth metal oxide.

3. A monolithic electronic element fabricated from a semiconducting ceramic according to claim 2, wherein the rare earth metal is Sm.

4. A monolithic electronic element fabricated from a semiconducting ceramic according to claim 3, wherein $0.01 \leq B/\beta \leq 0.50$ and $0.5 \leq B/(\alpha-\beta) \leq 8$.

5. A monolithic electronic element fabricated from a semiconducting ceramic according to claim 4, containing a donor element and an acceptor element in amounts satisfying the following relationships:

$$0.0001 \leq Md/\beta \leq 0.005$$

and $$0.00001 \leq Ma/\beta \leq 0.005$$

wherein Md represents the total number of atoms of a donor element in the semiconducting ceramic layers and Ma represents the total number of atoms of an acceptor element in the semiconducting ceramic layers.

6. A monolithic electronic element fabricated from a semiconducting ceramic according to claim 5, wherein the donor element is Sm and the acceptor element is Mn.

7. A monolithic electronic element fabricated from a semiconducting ceramic according to claim 1, wherein $0.01 \leq B/\beta \leq 0.50$ and $0.5 \leq B/(\alpha-\beta) \leq 8$.

8. A monolithic electronic element fabricated from a semiconducting ceramic according to claim 1, containing a donor element and an acceptor element in amounts satisfying the following relationships:

$$0.0001 \leq Md/\beta \leq 0.005$$

and $$0.00001 \leq Ma/\beta \leq 0.005$$

wherein Md represents the total number of atoms of a donor element in the semiconducting ceramic layers and Ma represents the total number of atoms of an acceptor element in the semiconducting ceramic layers.

9. A monolithic electronic element fabricated from a semiconducting ceramic according to claim 8, wherein the donor element is Sm and the acceptor element is Mn.

10. A semiconducting ceramic comprising a barium titanate containing boron oxide; an oxide of at least one metal selected from the group consisting of barium, strontium, calcium, lead, yttrium and rare earth element; wherein a portion of the titanium is optionally substituted by at least one metal selected from the group consisting of tin, zirconium, niobium, tungsten and antimony and the boron oxide being in an amount, as reduced to atomic boron, of $$0.001 \leq B/\beta \leq 0.50$$

and $$0.5 \leq B/(\alpha-\beta) \leq 10.0$$

wherein $\alpha$ represents the total number of atoms of barium, strontium, calcium, lead, yttrium and rare earth element contained in the semiconducting ceramic, and $\beta$ represents the total number of atoms of titanium, tin, zirconium, niobium, tungsten and antimony contained in the semiconducting ceramic.

11. A semiconducting ceramic according to claim 10, wherein the metal oxide is a rare earth metal oxide.

12. A semiconducting ceramic according to claim 11, wherein the rare earth metal is Sm.

13. A semiconducting ceramic according to claim 12, wherein $0.01 \leq B/\beta \leq 0.50$ and $0.5 \leq B/(\alpha-\beta) \leq 8$.

14. A semiconducting ceramic according to claim 13, containing a donor element and an acceptor element in amounts satisfying the following relationships:

$$0.0001 \leq Md/\beta \leq 0.005$$

and $$0.00001 \leq Ma/\beta \leq 0.005$$

wherein Md represents the total number of atoms of a donor element in the semiconducting ceramic layers and Ma represents the total number of atoms of an acceptor element in the semiconducting ceramic layers.

15. A semiconducting ceramic according to claim 14, wherein the donor element is Sm and the acceptor element is Mn.

16. A semiconducting ceramic according to claim 10, wherein $0.01 \leq B/\beta \leq 0.50$ and $0.5 \leq B/(\alpha-\beta) \leq 8$.

17. A semiconducting ceramic according to claim 10, further comprising:

a donor element and an acceptor element in amounts satisfying the following relationships:

$$0.0001 \leq Md/\beta \leq 0.005$$

and $$0.00001 \leq Ma/\beta \leq 0.005$$

wherein Md represents the total number of atoms of a donor element in the semiconducting ceramic and Ma represents the total number of atoms of an acceptor element in the semiconducting ceramic.

18. A semiconducting ceramic according to claim 16, wherein the donor element is Sm and the acceptor element is Mn.

* * * * *